(12) United States Patent
Huang et al.

(10) Patent No.: US 12,160,692 B2
(45) Date of Patent: Dec. 3, 2024

(54) PROJECTION APPARATUS, ILLUMINATION APPARATUS THEREOF, AND LIGHT SOURCE DRIVING METHOD THEREOF

(71) Applicant: Coretronic Corporation, Hsin-Chu (TW)

(72) Inventors: Hsin-Chang Huang, Hsin-Chu (TW); Chien-Yi Yang, Hsin-Chu (TW); Pei-Jen Liao, Hsin-Chu (TW); Yun-Shih Chen, Hsin-Chu (TW); Wei-Chih Su, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/183,965

(22) Filed: Mar. 15, 2023

(65) Prior Publication Data
US 2023/0300302 A1  Sep. 21, 2023

(30) Foreign Application Priority Data

Mar. 18, 2022  (CN) .......................... 202210271854.8

(51) Int. Cl.
*H04N 9/31*  (2006.01)

(52) U.S. Cl.
CPC ........... *H04N 9/3158* (2013.01); *H04N 9/312* (2013.01); *H04N 9/3155* (2013.01)

(58) Field of Classification Search
CPC .... H04N 9/312; H04N 9/3129; H04N 9/3155; H04N 9/31; H04N 9/3111; H04N 9/3108; H04N 9/3105; H04N 9/3102; H04N 9/3164; H04N 9/3158
See application file for complete search history.

(56) References Cited

U.S. PATENT DOCUMENTS

| | | | |
|---|---|---|---|
| 11,369,014 B2 | 6/2022 | Chang et al. | |
| 2006/0192728 A1* | 8/2006 | Kim | H05B 45/20 348/E9.027 |
| 2010/0225238 A1* | 9/2010 | Medin | H04N 9/3111 315/210 |
| 2012/0218283 A1* | 8/2012 | Ishii | H04N 9/3182 345/589 |
| 2020/0169708 A1* | 5/2020 | Su | H04N 9/3164 |

FOREIGN PATENT DOCUMENTS

| | | |
|---|---|---|
| CN | 103442478 | 12/2013 |
| CN | 106226983 | 11/2018 |

* cited by examiner

*Primary Examiner* — Xuemei Zheng
(74) *Attorney, Agent, or Firm* — JCIPRNET

(57) ABSTRACT

A projection apparatus, an illumination apparatus thereof, and a light source driving method thereof are provided. A control module converts a bit control signal into first light source timing signals, converts the first light source timing signals into second light source timing signals according to a lookup table, generates a driving current corresponding to each light source according to the lookup table, outputs second light source driving signals corresponding to the light sources according to the second light source timing signals. The lookup table includes a driving current ratio corresponding to the light sources. A driving module drives the light sources according to the second light source driving signals and the driving current for the light sources to have overlapping light-emitting timings.

9 Claims, 6 Drawing Sheets

PROJECTION APPARATUS, ILLUMINATION APPARATUS THEREOF, AND LIGHT SOURCE DRIVING METHOD THEREOF

CROSS-REFERENCE TO RELATED APPLICATION

This application claims the priority benefit of China application serial no. 202210271854.8, filed on Mar. 18, 2022. The entirety of the above-mentioned patent application is hereby incorporated by reference herein and made a part of this specification.

BACKGROUND

Technical Field

The disclosure relates to a display apparatus, and more particularly to a projection apparatus, an illumination apparatus thereof, and a light source driving method thereof.

Description of Related Art

A conventional projection apparatus structure controls light sources to emit light with non-overlapping light-emitting timings. For example, in the case where an illumination module of a projection apparatus includes red, green, and blue light sources, only light sources of one color can emit light within a time period. Therefore, this light-emitting mode often fails to meet brightness and color gamut requirements of current projection apparatuses.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection apparatus, an illumination apparatus thereof, and a light source driving method thereof that can control light sources to emit light with overlapping light-emitting timings and can meet brightness and color gamut requirements of the projection apparatus.

The illumination apparatus of the disclosure includes a light source module, a processing module, a control module, and a driving module. The light source module includes multiple light sources. The processing module is configured to generate a bit control signal according to an image signal. The control module is coupled to the processing module, and is configured to convert a bit control signal into multiple first light source timing signals, convert the first light source timing signals into multiple second light source timing signals according to a lookup table, generate a driving current corresponding to each light source according to the lookup table, output multiple first light source driving signals corresponding to the light sources according to the first light source timing signals, and output multiple second light source driving signals corresponding to the light sources according to the second light source timing signals. The lookup table includes a driving current ratio corresponding to the light sources. The driving module is coupled to the control module and the light source module, and is configured to drive the light sources according to the first light source driving signals and the driving current for the light sources to have non-overlapping light-emitting timings. The driving module is also configured to drive the light sources according to the second light source driving signals and the driving current for the light sources to have overlapping light-emitting timings.

The disclosure further provides a projection apparatus including an illumination apparatus, a light valve, and a projection lens. The illumination apparatus includes a light source module, a processing module, a control module, and a driving module. The light source module includes multiple light sources configured to provide an illumination beam. The processing module is configured to generate a bit control signal according to an image signal. The control module is coupled to the processing module, and is configured to convert a bit control signal into multiple first light source timing signals, convert the first light source timing signals into multiple second light source timing signals according to a lookup table, generate a driving current corresponding to each light source according to the lookup table, output multiple first light source driving signals corresponding to the light sources according to the first light source timing signals, and output multiple second light source driving signals corresponding to the light sources according to the second light source timing signals. The lookup table includes a driving current ratio corresponding to the light sources. The driving module is coupled to the control module and the light source module, and is configured to drive the light sources according to the first light source driving signals and the driving current for the light sources to have non-overlapping light-emitting timings. The driving module is also configured to drive the light sources according to the second light source driving signals and the driving current for the light sources to have overlapping light-emitting timings. The light valve is located on the transmission path of the illumination beam, and is configured to convert the illumination beam into an image beam. The projection lens is located on the transmission path of the image beam and projects the image beam out of the projection apparatus.

The disclosure further provides a light source driving method of an illumination apparatus. The illumination apparatus includes multiple light sources, and the light source driving method of the illumination apparatus includes the following steps. A processing module generates a bit control signal according to an image signal. A control module converts the bit control signal into multiple first light source timing signals, converts the first light source timing signals into multiple second light source timing signals according to a lookup table, generates a driving current corresponding to each light source according to the lookup table, outputs multiple first light source driving signals corresponding to the light sources according to the first light source timing signals, and outputs multiple second light source driving signals corresponding to the light sources according to the second light source timing signals. The lookup table includes a driving current ratio corresponding to the light sources. A driving module drives the light sources according to the first light source driving signals and the driving current for the light sources to have non-overlapping light-emitting timings, and drives the light sources according to the second light source driving signals and the driving current for the light sources to have overlapping light-emitting timings.

Based on the above, the control module of the embodiments of the disclosure may convert the bit control signal into the first light source timing signals, convert the first light source timing signals into the second light source timing signals according to the lookup table, generate the driving current corresponding to each light source according to the lookup table, and generate the corresponding second light source driving signals according to the second light source timing signals. The driving module may drive the light sources according to the second light source driving signals and the corresponding driving current for the light sources to have the overlapping light-emitting timings, and thus may improve the brightness of the projection image of the projection apparatus and meet color gamut requirements of the projection apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
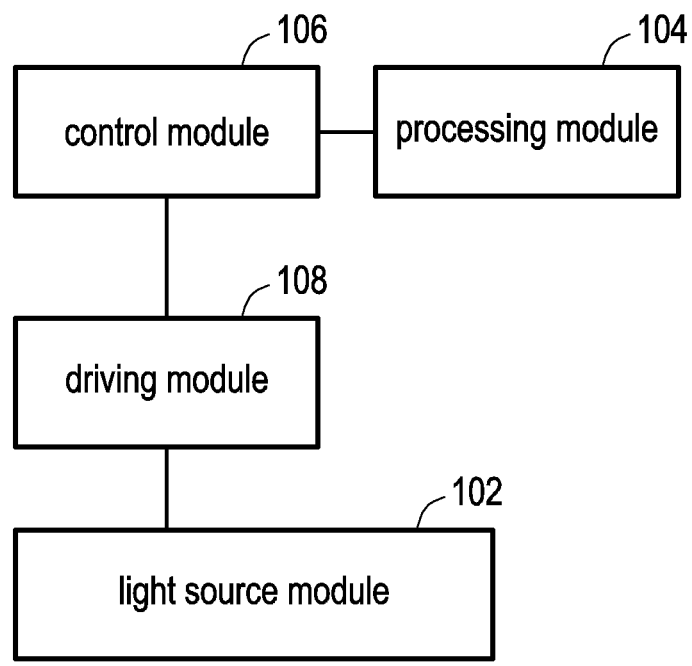
FIG. 1 is a schematic diagram of an illumination apparatus according to the embodiments of the disclosure.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In order to make the content of the disclosure easier to understand, the following specific embodiments are illustrated as examples of the actual implementation of the disclosure. In addition, wherever possible, components/members with the same reference numerals in the drawings and embodiments represent the same or similar parts.

Figure 2:
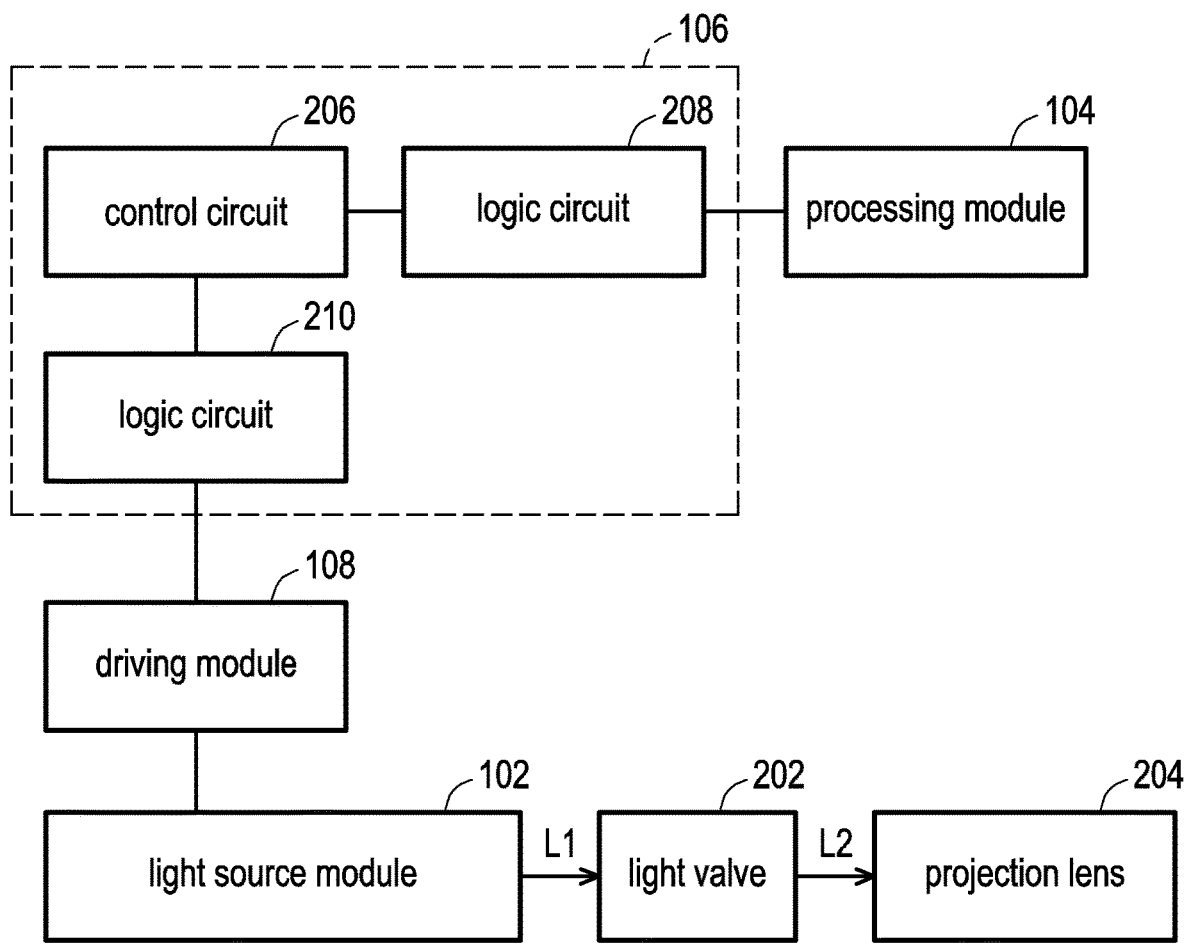
FIG. 2 is a schematic diagram of a projection apparatus according to the embodiments of the disclosure.

FIG. 1 is a schematic diagram of an illumination apparatus according to the embodiments of the disclosure. With reference to FIG. 1, the illumination apparatus may include a light source module 102, a processing module 104, a control module 106, and a driving module 108. The control module 106 is coupled to the processing module 104 and the driving module 108. The driving module 108 is also coupled to the light source module 102. The illumination apparatus may, for example, be applied to a projection apparatus. As shown in FIG. 2, in addition to the illumination apparatus, the projection apparatus may further include a light valve 202 and a projection lens 204. The light valve 202 is located in the transmission path of an illumination beam L1 provided by the light source module 102 of the illumination apparatus and may convert the illumination beam L1 into an image beam L2. The projection lens 204 is located on the transmission path of the image beam L2 and may project the image beam L2 out of the projection apparatus. In addition, in the embodiment of FIG. 2, the control module 106 may include a control circuit 206, a logic circuit 208, and a logic circuit 210. The logic circuit 208 is coupled to the processing module 104 and the control circuit 206, while the logic circuit 210 is coupled to the control circuit 206 and the driving module 108.

The driving module 108 is, for example, a light source driving circuit or other elements and circuits having driving functions.

The processing module 104, the control module 106, the logic circuit 208, and the logic circuit 210 are, for example, central processing units (CPU) or other programmable general-purpose or special-purpose micro control units (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable gate arrays (FPGA), or other similar elements or combinations of the above elements.

The light valve 202 is, for example, a reflective optical modulator such as a liquid crystal on silicon panel (LCoS panel) or a digital micro-mirror device (DMD). In some embodiments, the light valve 202 may also be a transmissive light modulator such as a transparent liquid crystal panel, an electro-optical modulator, a magneto-optical modulator, or an acousto-optic modulator (AOM). The disclosure does not limit the type or form of the light valve 202.

The projection lens 204 includes, for example, one or a combination of multiple optical lenses having a diopter, such as various combinations of non-planar lenses including biconcave lenses, biconvex lenses, concave-convex lenses, convex-concave lenses, plane-convex lenses, and plane-concave lenses. In an embodiment, the projection lens 204 may further include a planar optical lens to project the image beam L2 from the light valve 202 to a projection target in a reflective manner. The disclosure does not limit the type or form of the projection lens 204.

The light source module 102 may include multiple light sources (not shown), such as multiple light-emitting diodes (LEDs), but the disclosure is not limited thereto. The processing module 104 may generate a bit control signal according to an image signal, such as generating a two-bit control signal in order to, for example, control the light states of the red, green, and blue light sources included in the light source module 102. For example, the red, green, and blue light sources are controlled to be turned off at the same time or o emit light independently, but the disclosure is not limited thereto.

The control module 106 may convert the bit control signal into multiple first light source timing signals, such as using a truth table in a logic circuit to convert the first light source timing signals into multiple second light source timing signals according to a lookup table and to generate multiple corresponding first light source driving signals or multiple corresponding second light source driving signals according to the first light source timing signals and the second light source timing signals for the driving module 108. Furthermore, the logic circuit 208 may convert the bit control signal into the first light source timing signals, and the control circuit 206 may convert the first light source timing signals into the second light source timing signals according to the lookup table.

Figure 3:
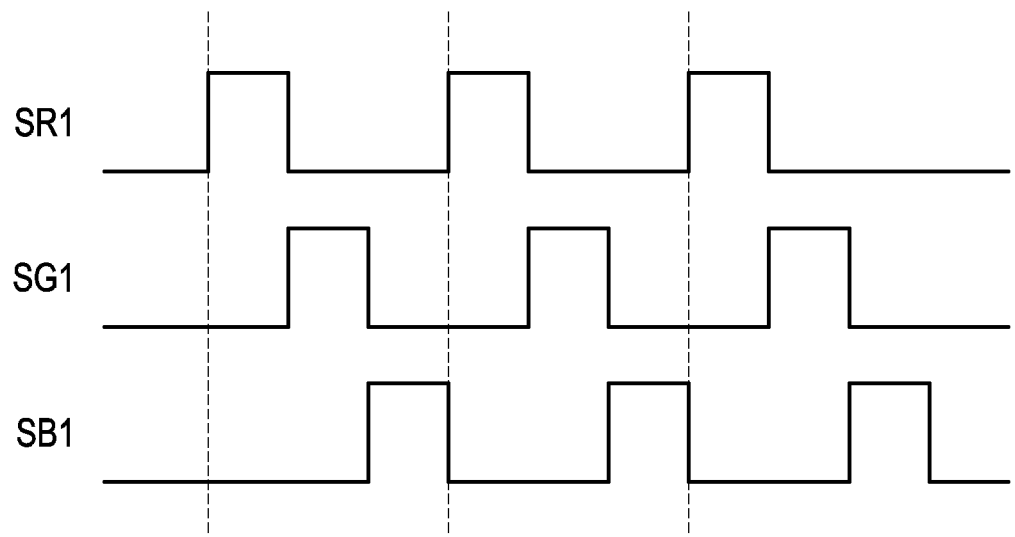
FIG. 3 is a schematic waveform diagram of first light source timing signals according to the embodiments of the disclosure.
Figure 4:
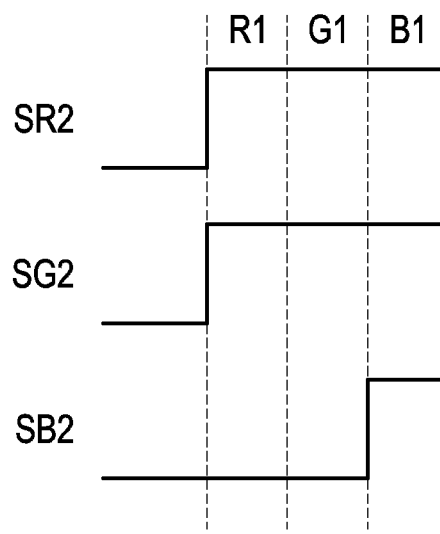
FIG. 4 is a schematic waveform diagram of second light source timing signals according to the embodiments of the disclosure.

The first light source timing signals are configured to instruct the light sources of the light source module 102 to emit light with non-overlapping light-emitting timings. For example, as shown in FIG. 3, first light source timing signals SR1, SG1, and SB1 may respectively be configured to control the light-emitting states of the red, green, and blue light sources. When the first light source timing signal SR1, SG1, or SB1 is at a high logic level, the corresponding red, green, or blue light source is in a light-emitting state; when the first light source timing signal SR1, SG1, or SB1 is at a low logic level, the corresponding red, green, or blue light source is in a non-light-emitting state. The second light source timing signals are configured to instruct the light sources of the light source module 102 to emit light with overlapping light-emitting timings. For example, as shown in FIG. 4, second light source timing signals SR2, SG2, and SB2 may respectively be configured to control the light-emitting states of the red, green, and blue light sources. When the second light source timing signal SR2, SG2, or SB2 is at the high logic level, the corresponding red, green, or blue light source is in the light-emitting state; when the second light source timing signal SR2, SG2, or SB2 is at the low logic level, the corresponding red, green, or blue light source is in the non-light-emitting state. For example, since red light R1 and green light G1 provided by the illumination apparatus may include light emitted by the red light source and the green light source, the second light source timing signals SR2 and SG2 are at the high logic level while the second light source timing signal SB2 is at the low logic level. For example again, since blue light B1 provided by the illumination apparatus may include light emitted by the red light source, the green light source, and the blue light source, the second light source timing signals SR2, SG2, and SB2 are all at the high logic level.

Figure 5:
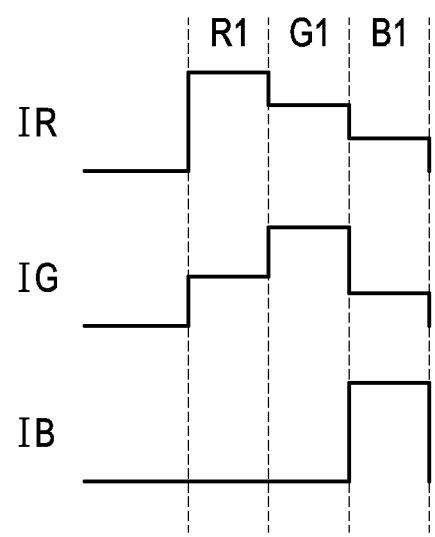
FIG. 5 is a schematic waveform diagram of a driving current according to the embodiments of the disclosure.

In addition, the lookup table may further include a driving current ratio corresponding to the light sources, and the control circuit 206 may further generate a driving current corresponding to each light source according to the lookup table. In further explanation, the driver current corresponding to each light source may be generated by the control circuit 206 according to the lookup table. For example, as shown in FIG. 5, the red light R1 provided by the illumination apparatus may include light emitted by the red light source and the green light source, and the control module 106 may obtain the ratio of the driving currents required for providing the red light R1 that the illumination apparatus provides to the red, green, and blue light sources respectively according to the lookup table. For example, in this embodiment, the ratio of driving currents IR, IG, and IB provided to the red, green, and blue light sources is 1:0.5:0, which means if the driving current TR provided to the red light source is 1 mA, the driving currents IG and IB provided to the green light source and the blue light source are 0.5 mA and 0 mA respectively. Similarly, the ratio of the driving currents IR, IG, and IB required for providing the green light G1 that the illumination apparatus provides to the red, green, and blue light sources respectively may be, for example, 0.8:1:0, and the ratio of the driving currents IR, IG, and IB required for providing the blue light B1 that the illumination apparatus provides to the red, green, and blue light sources respectively may be, for example, 0.4:0.4:1. The driving current ratio between the red, green, and blue light sources may vary depending on the actual situation.

The logic circuit 210 may output the corresponding first light source driving signals according to the first light source timing signals (e.g., the first light source timing signals SR1, SG1, and SB1), output the corresponding second light source driving signals according to the second light source timing signals (e.g., the second light source timing signals SR2, SG2, and SB2), and output the driving current provided by the control module 106 to the driving module 108.

The driving module 108 may drive the light sources (e.g., the red, green, and blue light sources) included in the light source module 102 according to the first light source driving signals and the driving current of each light source (e.g., the driving currents IR, IG, and IB) provided by the control module 106 to emit light with non-overlapping light-emitting timings, or may drive the light sources included in the light source module 102 according to the second light source driving signals and the driving current of each light source provided by the control module 106 to emit light with overlapping light-emitting timings.

The control module 106 converts the bit control signal into the first light source timing signals, converts the first light source timing signals into the second light source timing signals and generates the driving current corresponding to each light source according to the lookup table, and generates the corresponding second light source driving signals according to the second light source timing signals. The driving module drives the light sources according to the second light source driving signals and the corresponding driving current. In this way, the light sources can have overlapping light-emitting timings, thereby improving the brightness of the projection image of the projection apparatus and meeting color gamut requirements of the projection apparatus.

Figure 6:
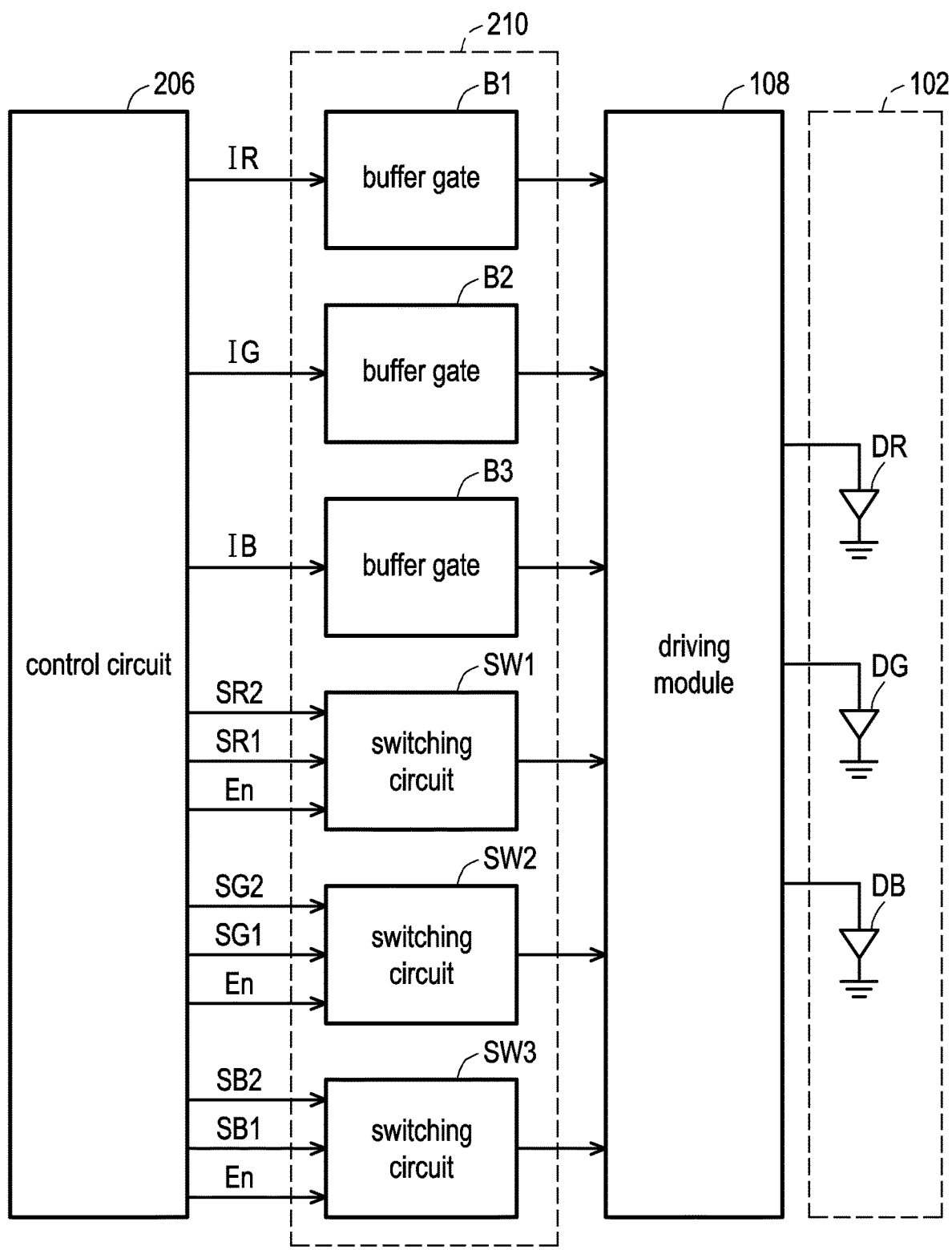
FIG. 6 is a schematic diagram of a driving light source module according to the embodiments of the disclosure.

Furthermore, the light source module 102 may be driven as shown in FIG. 6. In this embodiment, the logic circuit 210 may include buffer gates B1 to B3 and switching circuits SW1 to SW3. The light source module may include red, green, and blue LEDs DR, DG, and DB. The buffer gates B1 to B3 are coupled to the control circuit 206 and the driving module 108. The switching circuits SW1 to SW3 are coupled to the control circuit 206 and the driving module 108. The anodes of the LEDs DR, DG, and DB are respectively coupled to the driving module 108, and the cathodes of the LEDs DR, DG, and DB are grounded together. The LEDs DR, DG, and DB of this embodiment are coupled in a common cathode manner, and driving elements in this way can reduce energy consumption thereof. In other embodiments, the LEDs DR, DG, and DB may also be coupled in a common anode manner. The buffer gates B1 to B3 are configured to output the driving current corresponding to each of the light sources DR DG, and DB (e.g., the driving currents IR, IG, and IB in the embodiment of FIG. 5, but the disclosure is not limited thereto), and the driving module 108 provides the driving current to the light source module 102.

The switching circuits SW1 to SW3 may select to output the first light source timing signals as the first light source driving signals in response to the enable signals En provided by the control circuit 206, or may select to output the second light source timing signals as the second light source driving signals in response to the enable signal En provided by the control circuit 206. For example, when the LEDs DR, DG, and DB emit light with non-overlapping light-emitting timings, the control circuit 206 may have the enable signals En all at the low logic level for the switching circuits SW1 to SW3 to respectively output the first light source timing signals with non-overlapping light-emitting timings as the first light source driving signals. For example, the first light source timing signals SR1, SG1, and SB1 shown in FIG. 3 may be used as the first light source driving signals, but the disclosure is not limited thereto. On the other hand, when the LEDs DR, DG, and DB emit light with overlapping light-emitting timings, the control circuit 206 may adjust the logic levels of the enable signals provide to the switching circuits SW1 to SW3 according to the light-emitting requirements of the illumination apparatus to control the light-emitting timings of the LEDs DR, DG, and DB. For example, the logic levels of the second light source timing signals SR2, SG2, and SB2 may be adjusted as shown in FIG. 4, but the disclosure is not limited thereto. When the enable signals En provided to the switching circuits SW1 to SW3 are at the high logic level, the switching circuits SW1 to SW3 select to output the second light source timing signals SR2, SG2, and SB2 as the second light source driving signals. The enable signals En provided to the switching circuits SW1 to SW3 corresponding to the second light source driving signals in this embodiment is at the high logic level, but the disclosure is not limited thereto. When the enable signals En provided to the switching circuits SW1 to SW3 are at the low logic level, the switching circuits SW1 to SW3 select the first light source timing signals SR1, SG1, and SB1 as the driving signals.

In this way, the driving module 108 can know the LED emitting light according to the first light source driving signals or the second light source driving signals, and can know the size of current for driving the LEDs DR, DG, and DB according to the driving currents IR, IG, and IB. Therefore, the driving module 108 can control the light-emitting states of the LEDs DR, DG, and DB as required. It should be noted that the cathodes of the LEDs DR, DG, and DB of this embodiment are commonly coupled to each other, which can reduce power consumption. However, in some embodiments, the LEDs DR, DG, and DB may also be coupled in a way of coupling the cathodes of the LEDs DR, DG, and DB respectively to the corresponding light source driving circuits and coupling the anodes of the LEDs DR, DG, and DB to each other, which is not limited by the coupling method in the embodiments of the disclosure.

Figure 7:
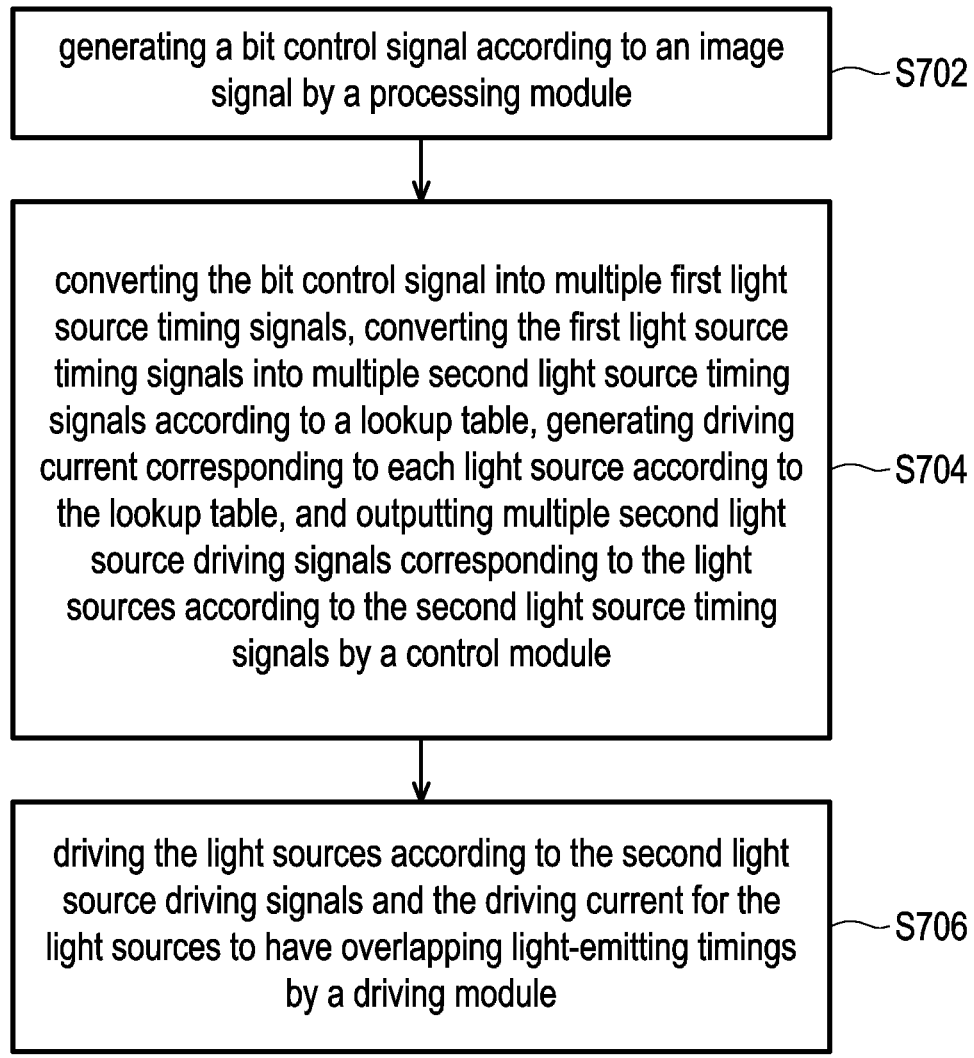
FIG. 7 is a flowchart of a light source driving method of an illumination apparatus according to the embodiments of the disclosure.

FIG. 7 is a flowchart of a light source driving method of an illumination apparatus according to the embodiments of the disclosure. According to the above embodiments, the light source driving method of the illumination apparatus may include the following steps. First of all, a processing module generates a bit control signal according to an image signal (step S702). Next, a control module converts the bit control signal into multiple first light source timing signals, converts the first light source timing signals into multiple second light source timing signals according to a lookup table, generates a driving current corresponding to each light source according to the lookup table, outputs multiple first light source driving signals corresponding to the light sources according to the first light source timing signals, and outputs multiple second light source driving signals corresponding to the light sources according to the second light source timing signals (step S704). The lookup table may include a driving current ratio corresponding to the light sources. Next, a driving module drives the light sources according to the first light source driving signals and the driving current for the light sources to have non-overlapping light-emitting timings, and drives the light sources according to the second light source driving signals and the driving current for the light sources to have overlapping light-emitting timings (step S706).

In summary, the control module of the embodiments of the disclosure may convert the bit control signal into the first light source timing signals and convert the first light source timing signals into the second light source timing signals according to the lookup table. Compared to a traditional projection apparatus, the disclosure may rapidly generate the driving current corresponding to each light source according to the lookup table, and generate the corresponding second light source driving signals according to the second light source timing signals. The driving module may drive the light sources according to the second light source driving signals and the corresponding driving current for the light sources to have the overlapping light-emitting timings, and thus may improve the brightness of the projection image of the projection apparatus and meet color gamut requirements of the projection apparatus. The projection apparatus of the disclosure may allow the light sources to have overlapping or non-overlapping light-emitting timings according to actual application conditions and can thus be adapted to many different application scenarios.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination apparatus, comprising:
    a light source module, comprising a plurality of light sources;
    a processing module, configured to generate a bit control signal according to an image signal;
    a control module, coupled to the processing module, and the control module comprising a first logic circuit, a control circuit, and a second logic circuit; wherein
    the first logic circuit is coupled to the processing module, and is configured to
        convert the bit control signal into a plurality of first light source timing signals;
    the control circuit is coupled to the first logic circuit and is configured to convert the plurality of first light source timing signals into a plurality of second light source timing signals according to a lookup table and
        generate a driving current corresponding to each of the plurality of light sources according to the lookup table; and
    the second logic circuit is coupled to the control circuit and is configured to output a plurality of second light source driving signals corresponding to the plurality of light sources according to the plurality of second light source timing signals; and
    a driving module, coupled to the second logic circuit of the control module and the light source module, and configured to
        drive the plurality of light sources according to the plurality of second light source driving signals and the driving current corresponding to each of the plurality of light sources to have overlapping light-emitting timings.

2. The illumination apparatus according to claim 1, wherein the lookup table comprises a driving current ratio corresponding to the plurality of light sources.

3. The illumination apparatus according to claim 2, wherein the second logic circuit comprises:
    a plurality of buffer gates, coupled to the control circuit and the driving module, and configured to output the driving current corresponding to each of the plurality of light sources to the light source module; and
    a plurality of switching circuits, respectively coupled to the control circuit, and configured to:
        select to output the plurality of first light source timing signals as a plurality of first light source driving signals in response to a plurality of enable signals provided from the control circuit; or
        select to output the plurality of second light source timing signals as the plurality of second light source driving signals in response to a plurality of enable signals provided from the control circuit.

4. The illumination apparatus according to claim 1, wherein the plurality of light sources comprise a plurality of light-emitting diodes, anodes of the plurality of light-emitting diodes are respectively coupled to the driving module, and cathodes of the plurality of light-emitting diodes are coupled to each other.

5. A projection apparatus, comprising:
    an illumination apparatus, comprising:
        a light source module, comprising a plurality of light sources configured to provide an illumination beam;
        a processing module, configured to generate a bit control signal according to an image signal;
        a control module, coupled to a processing module, and the control module comprising a first logic circuit, a control circuit, and a second logic circuit; wherein
        the first logic circuit is configured to convert the bit control signal into a plurality of first light source timing signals;
        the control circuit is coupled to the first logic circuit and is configured to convert the plurality of first light source timing signals into a plurality of second light source timing signals according to a lookup table and
            generate a driving current corresponding to each of the plurality of light sources according to the lookup table; and
        the second logic circuit is coupled to the control circuit and is configured to output a plurality of second light source driving signals corresponding to the plurality of light sources according to the plurality of second light source timing signals,
        a driving module, coupled to the second logic circuit of the control module and the light source module, and configured to drive the plurality of light sources according to the plurality of second light source driving signals and the driving current corresponding to each of the plurality of light sources to have overlapping light-emitting timings;
    a light valve, located on a transmission path of the illumination beam, and configured to convert the illumination beam into an image beam; and
    a projection lens, located on a transmission path of the image beam, and configured to project the image beam out of the projection apparatus.

6. The projection apparatus according to claim 5, wherein the lookup table comprises a driving current ratio corresponding to the plurality of light sources.

7. The projection apparatus according to claim 5, wherein the second logic circuit comprises:
    a plurality of buffer gates, coupled to the control circuit and the driving module, and configured to output the driving current corresponding to each of the plurality of light sources to the light source module; and
    a plurality of switching circuits, respectively coupled to the control circuit, and configured to:
        select to output the plurality of first light source timing signals as the plurality of first light source driving signals in response to a plurality of enable signals provided from the control circuit; or
        select to output the plurality of second light source timing signals as the plurality of second light source driving signals in response to a plurality of enable signals provided from the control circuit.

8. The projection apparatus according to claim 5, wherein the plurality of light sources comprise a plurality of light-emitting diodes, anodes of the plurality of light-emitting diodes are respectively coupled to the driving module, and cathodes of the plurality of light-emitting diodes are coupled to each other.

9. A light source driving method of an illumination apparatus, the illumination apparatus comprising a plurality of light sources, and the light source driving method of the illumination apparatus comprising:

generating a bit control signal according to an image signal by a processing module;

converting the bit control signal into a plurality of first light source timing signals by a first logic circuit of a control module;

converting the first light source timing signals into a plurality of second light source timing signals according to a lookup table, generating a driving current corresponding to each of the plurality of light sources according to the lookup table by a control circuit of the control module, wherein the control circuit is coupled to the first logic circuit;

outputting a plurality of second light source driving signals corresponding to the plurality of light sources according to the plurality of second light source timing signals by a second logic circuit of the control module, wherein the second logic circuit is coupled to the control circuit; and driving the plurality of light sources according to the plurality of second light source driving signals and the driving current for the plurality of light sources to have overlapping light-emitting timings by a driving module, wherein the driving module is coupled to the second logic circuit.

\* \* \* \* \*